(12) United States Patent
Hayashi

(10) Patent No.: US 7,032,879 B2
(45) Date of Patent: Apr. 25, 2006

(54) VALVE DEVICE HAVING A PLURALITY OF SOLENOIDS

(75) Inventor: Bunya Hayashi, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 77 days.

(21) Appl. No.: 10/829,951

(22) Filed: Apr. 23, 2004

(65) Prior Publication Data

US 2004/0222397 A1 Nov. 11, 2004

(30) Foreign Application Priority Data

May 9, 2003 (JP) ............................. 2003-132109

(51) Int. Cl.
*F16K 31/02* (2006.01)
(52) U.S. Cl. ............................. 251/129.09; 251/129.16
(58) Field of Classification Search ........... 251/129.09, 251/129.16, 175
See application file for complete search history.

(56) References Cited

U.S. PATENT DOCUMENTS

| | | | |
|---|---|---|---|
| 2,587,356 A * | 2/1952 | McPherson | ................ 137/613 |
| 2,911,183 A * | 11/1959 | Matthews et al. | ..... 251/129.02 |
| 3,133,234 A * | 5/1964 | Dietz | ........................ 335/245 |
| 6,105,931 A * | 8/2000 | Frank et al. | ........... 251/129.15 |

FOREIGN PATENT DOCUMENTS

| | | |
|---|---|---|
| JP | 58-33334 | 7/1983 |
| JP | 5-11409 | 3/1993 |

* cited by examiner

*Primary Examiner*—Edward K. Look
*Assistant Examiner*—John K. Fristoe, Jr.
(74) *Attorney, Agent, or Firm*—Oblon, Spivak, McClelland, Maier & Neustadt, P.C.

(57) ABSTRACT

To provide a valve device in which a width of a valve body portion is minimized while suppressing reductions in responsiveness and a flow rate and in which a solenoid portion can produce a necessary output with a small width by using an open/close valve with a short stroke. A solenoid valve device for opening and closing an output flow path for pressurized fluid includes the solenoid portion, the valve body portion 3 in which valve seats are formed to be elongated in the direction of arrangement of the plurality of solenoids, and a movable valve made of a paramagnetic material to open and close the valve seats. The solenoid portion includes a plurality of solenoids having attracting faces which are at one ends of fixed cores and are arranged to be adjacent to each other on the same plane and a common magnetic frame covering the solenoids. Wiring is installed for the solenoid portion so that polarities of magnetic fluxes generated in the fixed cores of the adjacent solenoids during energization are opposite each other or are in the same direction.

20 Claims, 7 Drawing Sheets

(A)

(B)

VALVE DEVICE HAVING A PLURALITY OF SOLENOIDS

TECHNICAL FIELD

The present invention relates to a two-port valve device which has a short stroke wherein a large number of the devices densely arranged in a row can be made compact as a whole while suppressing reductions in responsiveness and a flow rate.

PRIOR ART

As disclosed in Japanese Utility Model Publication No. 58-3334, a valve device is known including a solenoid portion having a movable core and a valve body portion which is connected to the solenoid portion, which has an input flow path and an output flow path for pressurized fluid, and in which a valve seat between these flow paths is opened and closed by a valve element driven by the movable core. In this valve device, a length of a stroke of the movable core in the solenoid portion is minimized to thereby miniaturize the solenoid portion.

As disclosed in Japanese Utility Model Publication No. 5-11409, an open/close valve is known in which an opening of an output-side flow path is opened and closed by a plate-shaped valve element driven by electromagnetic force or the like. In this open/close valve, the whole device can be miniaturized with a short stroke and with an increased flow rate.

These open/close valves are excellent in responsiveness because they are fully opened with short strokes of the movable cores.

In a valve device in which a length of an opening/closing stroke is minimized with a small solenoid to thereby improve opening/closing responsiveness of a valve as in the open/close valves in the above patent documents 1 and 2, in order to densely arrange the large number of valve devices in a row to make the entire devices compact, it is necessary to minimize the width of each a valve body portion and to further miniaturize the small solenoid. To achieve these purposes while suppressing reductions in responsiveness and a flow rate, it is necessary to consider making a major structural change in some way.

DISCLOSURE OF THE INVENTION

It is a technical object of the present invention to provide a valve device the large number of which densely arranged in a row can be made compact as a whole while suppressing reductions in responsiveness and a flow rate by using the above-described open/close valve with a short stroke.

It is a further concrete technical object of the invention to provide a valve device in which a width of a valve body portion is minimized while suppressing reductions in responsiveness and the flow rate and a solenoid portion can produce a necessary output with a small width corresponding to the width of the valve body portion by using the above-described open/close valve with the short stroke.

It is another technical object of the invention to provide a valve device in which an output of a solenoid can be enhanced while reducing a width of the solenoid considering that there is a limit to enhancement of the output if a width of a valve body portion is reduced and the width of the solenoid is also reduced to correspond to the valve body portion when a single solenoid is used.

To achieve the above objects, according to the present invention, there is provided a valve device comprising: a solenoid portion having magnetic attracting faces for attracting a movable valve at one end of the fixed cores disposed in coils; a valve body portion connected to the solenoid portion and having an input flow path and an output flow path for pressurized fluid; and a movable valve made of paramagnetic material to open and close a valve seat between both the flow paths, the valve device carrying out opening and closing of the valve seat by the movable valve according to actuation of the solenoid portion, wherein the solenoid portion has a plurality of solenoids having the attracting faces of the fixed cores arranged to be adjacent each other on the same plane and a common magnetic frame covering the solenoids and having a top panel portion in contact with end faces of the respective fixed cores on opposite sides to the attracting faces, the output flow path for the pressurized fluid in the valve body portion is formed to be long in an arranged direction of the plurality of solenoids, the movable valve has a portion facing at least the respective fixed cores and attracted by the fixed cores when the plurality of solenoids are energized, and means for seating the movable valve on the valve seat when the energization is cancelled is provided.

Cushions projecting to such an extent as to prevent the movable valve from coming in close contact with the attracting faces of the fixed cores when the solenoids are energized may be disposed at peripheries of the fixed core.

The above valve device further comprises a magnetic plate disposed substantially on the same plane as the magnetic attracting faces of the fixed cores, magnetically joined to the magnetic frame, and not joined to the fixed cores, wherein the movable valve has portions respectively facing the respective fixed cores and the magnetic plate on opposite sides of the fixed cores and attracted by the fixed cores and the magnetic plate when the plurality of solenoids are energized. It is also possible that the magnetic plate is not provided, that a plate not made of magnetic material is provided, and that the movable valve only faces the magnetic attracting faces of the fixed cores of the plurality of solenoids or faces the magnetic attracting faces and tip ends of side panel portions of the magnetic frame.

In these cases, wiring may be installed for the plurality of solenoids so that polarities of magnetic fluxes generated in the fixed cores of the adjacent solenoids when the solenoids are energized are opposite to each other.

In the valve device of the invention, as means for seating the movable valve on the valve seat when the energization is cancelled, the movable valve is preferably arranged so that the pressurized fluid from the input flow path presses the movable valve against the valve seat in which the output flow path is open.

Moreover, in another preferred embodiment of the invention, cushions for applying resistance to magnetic fluxes between the fixed cores and the magnetic plate and projecting to such an extent as to prevent the movable valve from coming in close contact with the attracting faces of the fixed cores and the magnetic plate when the solenoids are energized are disposed between the fixed cores and the magnetic plate.

In another preferred embodiment of the invention, a plurality of valve seats are provided to face the attracting faces of the fixed cores of the plurality of solenoids and are arranged in a row so as to be long in a direction in which the solenoids are adjacent to each other.

In the valve device having the above structure, because the plurality of solenoids are provided and the output flow path which is long in the arranged direction of the solenoids is provided, the large number of the valve devices densely arranged in a row can be made compact as a whole while suppressing reductions in responsiveness and a flow rate by using an open/close valve with a short stroke. Furthermore, because the plurality of solenoids are arranged in a row in the solenoid portion, a strong attracting force can be obtained, though the solenoid portion has a small width corresponding to the width of the valve body portion. Moreover, it is also possible to install wiring to the solenoid portion so that the polarities of the magnetic fluxes generated in the fixed cores of the adjacent solenoids are opposite to each other in energization of the solenoid portion to thereby simplify the structure of the magnetic plate and the like.

BRIEF DESCRIPTION OF THE INVENTION

Figure 4:
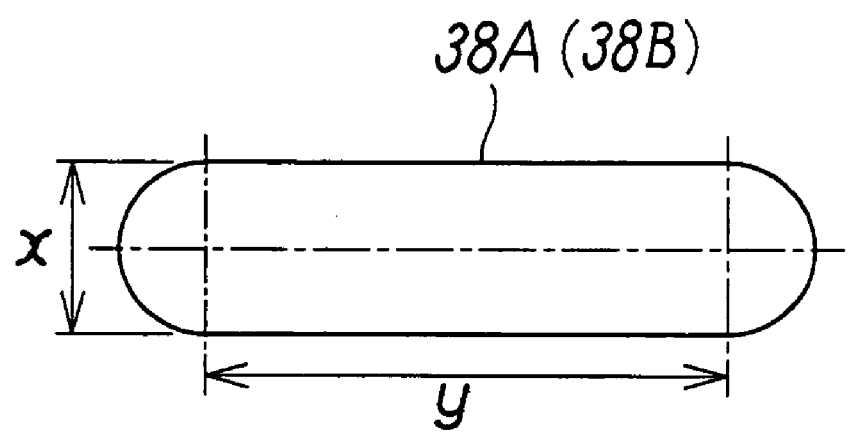
Figure 4:
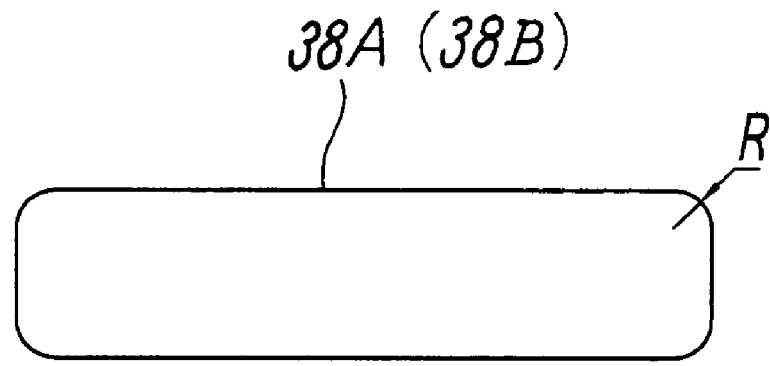

FIGS. 4(A) and 4(B) are explanatory views of shapes of valve seats.

Figure 5:
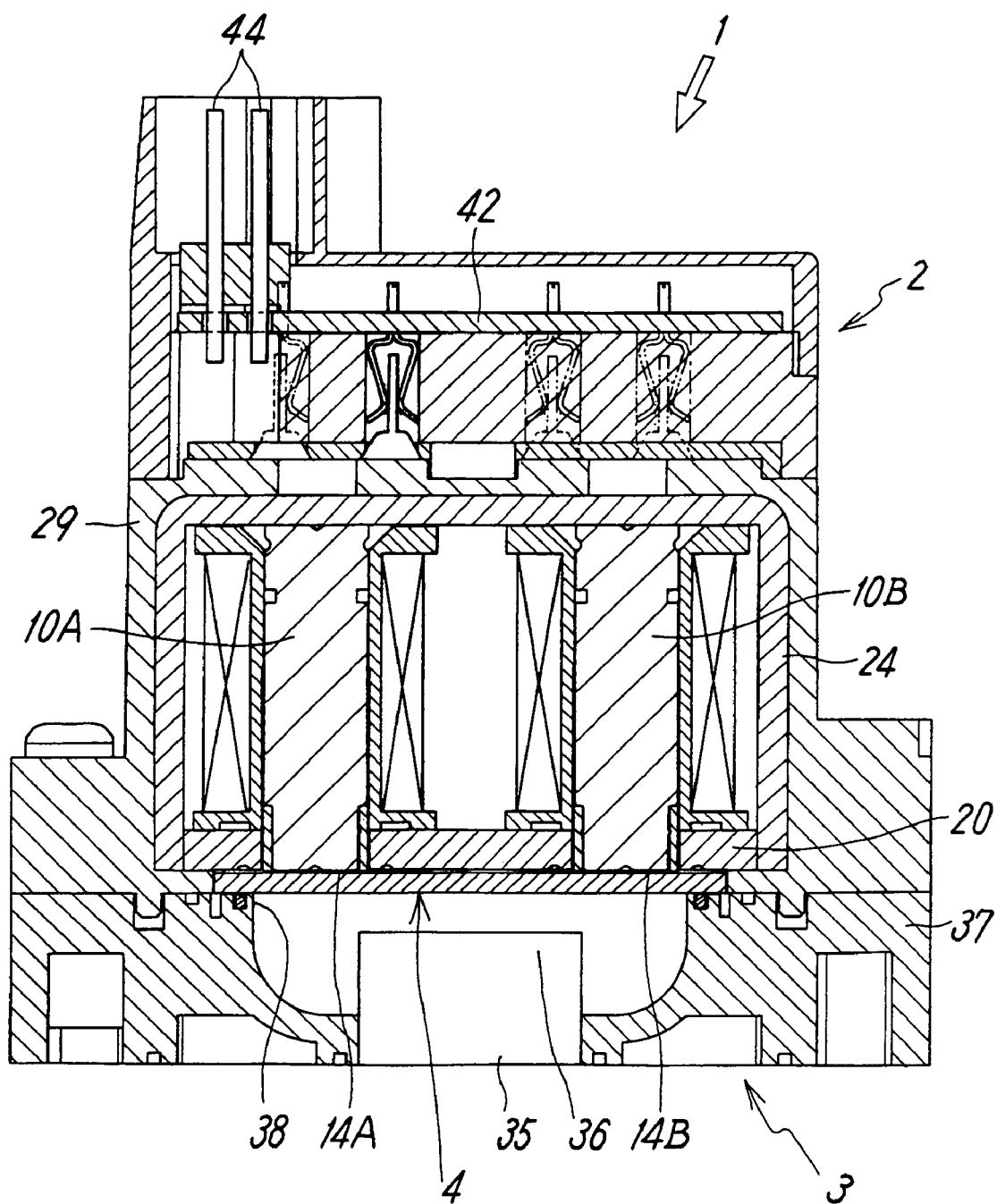

FIG. 5 is a sectional view of another embodiment of the invention.

Figure 6:
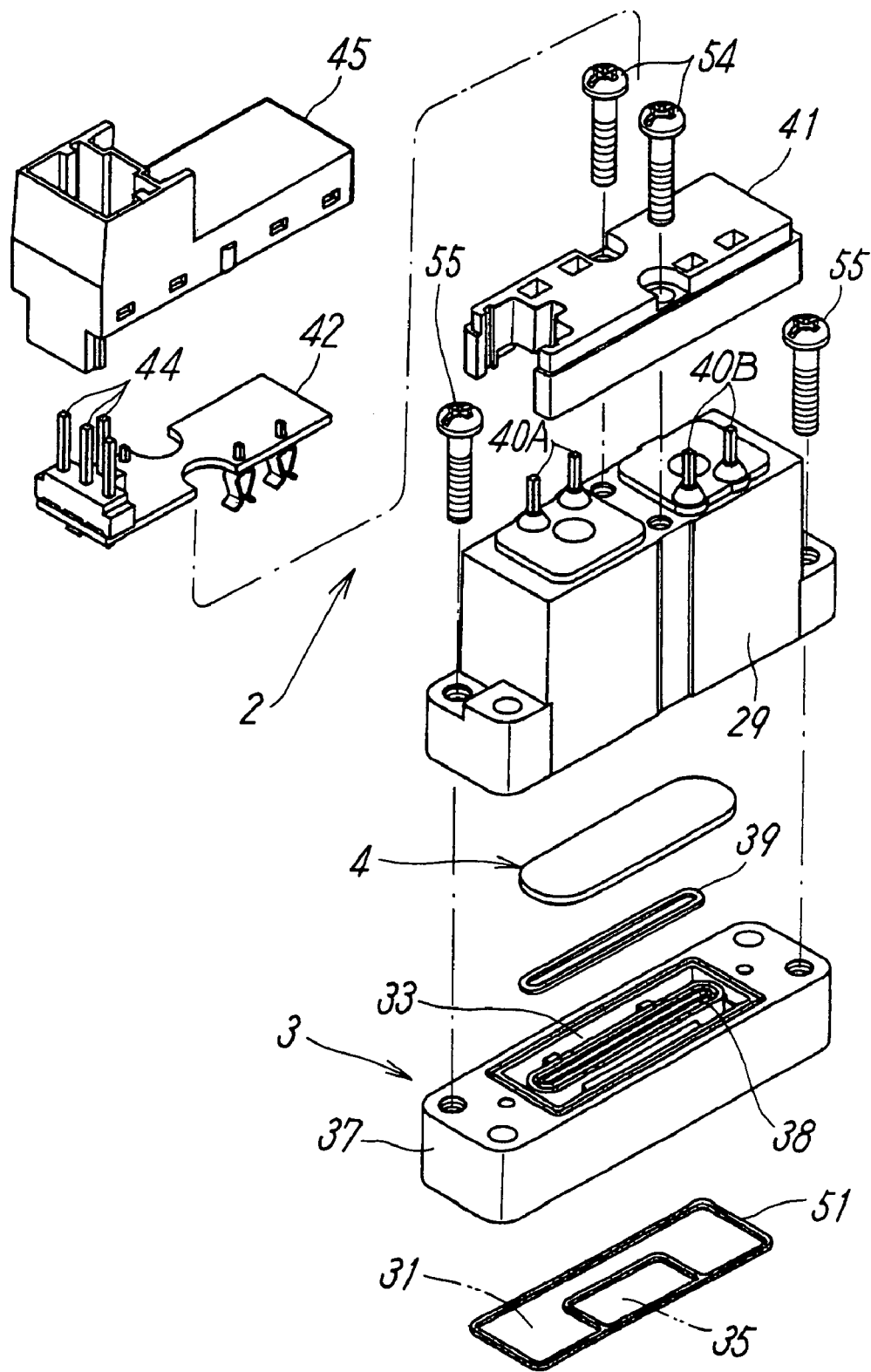

FIG. 6 is an exploded perspective view of the embodiment in FIG. 5.

Figure 7:
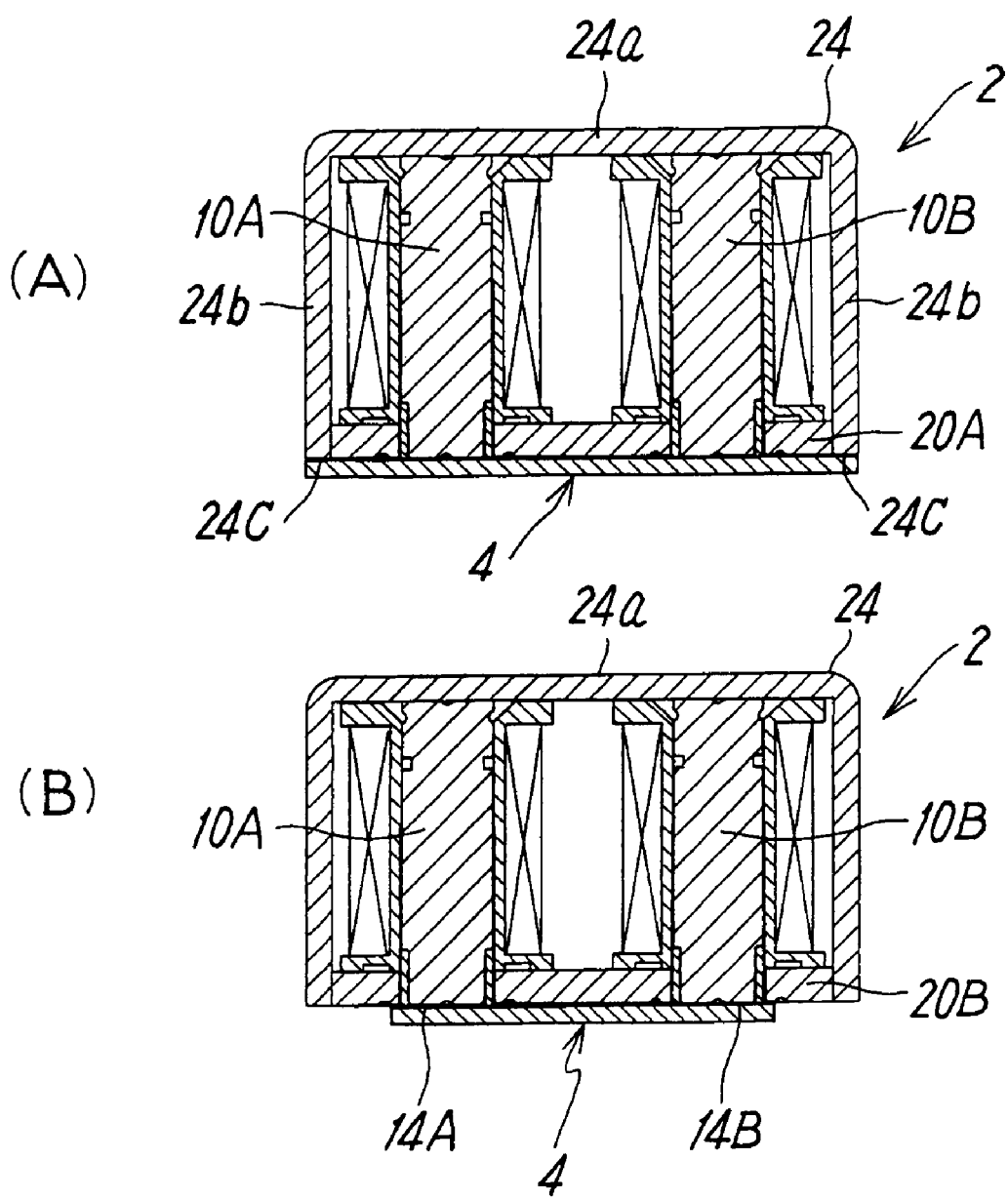

FIGS. 7(A) and 7(B) are schematic sectional views showing different examples of structures of a solenoid portion and the movable valve.

DETAILED DESCRIPTION OF THE PREFERRED EMBODIMENTS

The present invention will be described below in further detail based on embodiments shown in the drawings.

Figure 1:
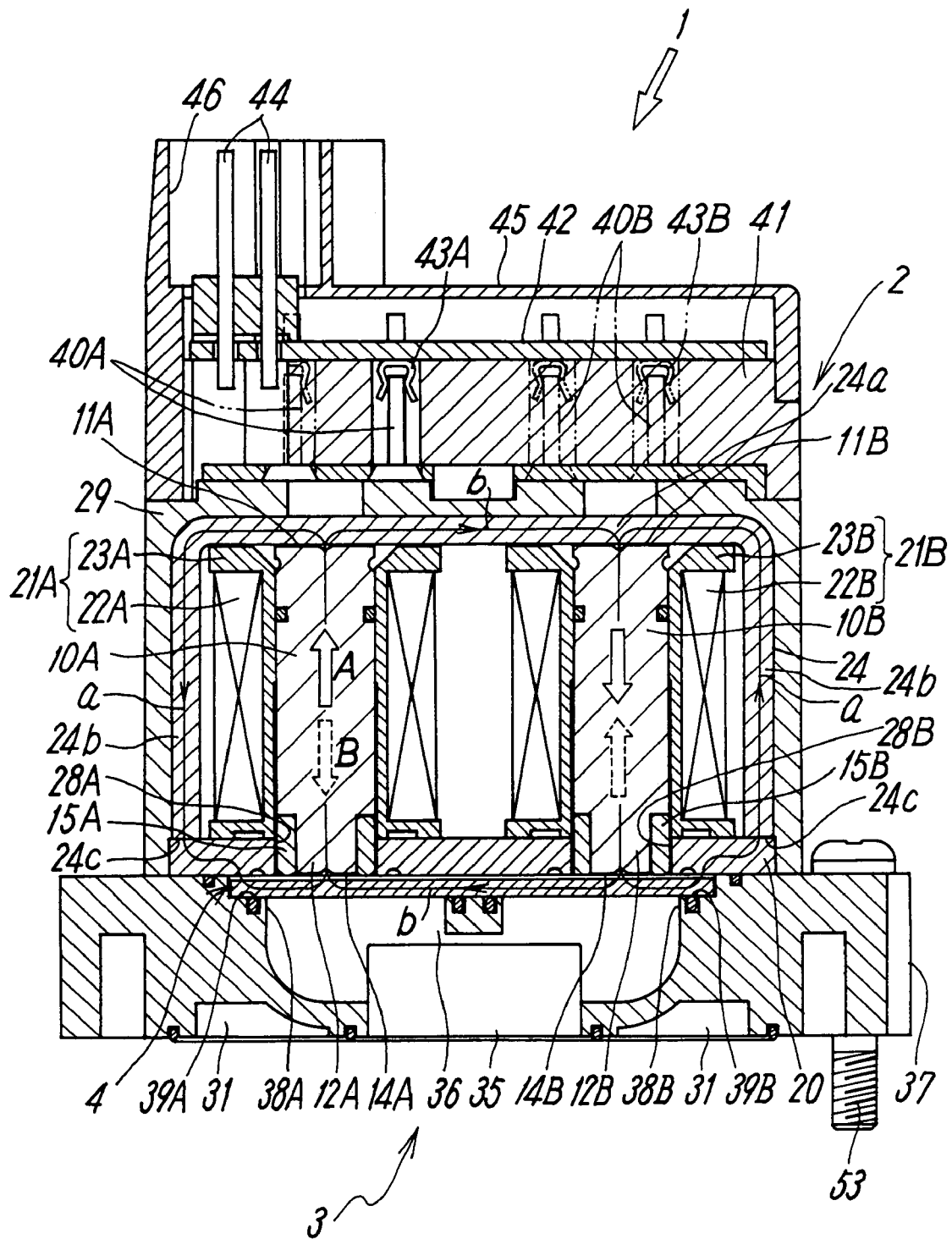
FIG. 1 is a sectional view of an embodiment of the present invention.
Figure 2:
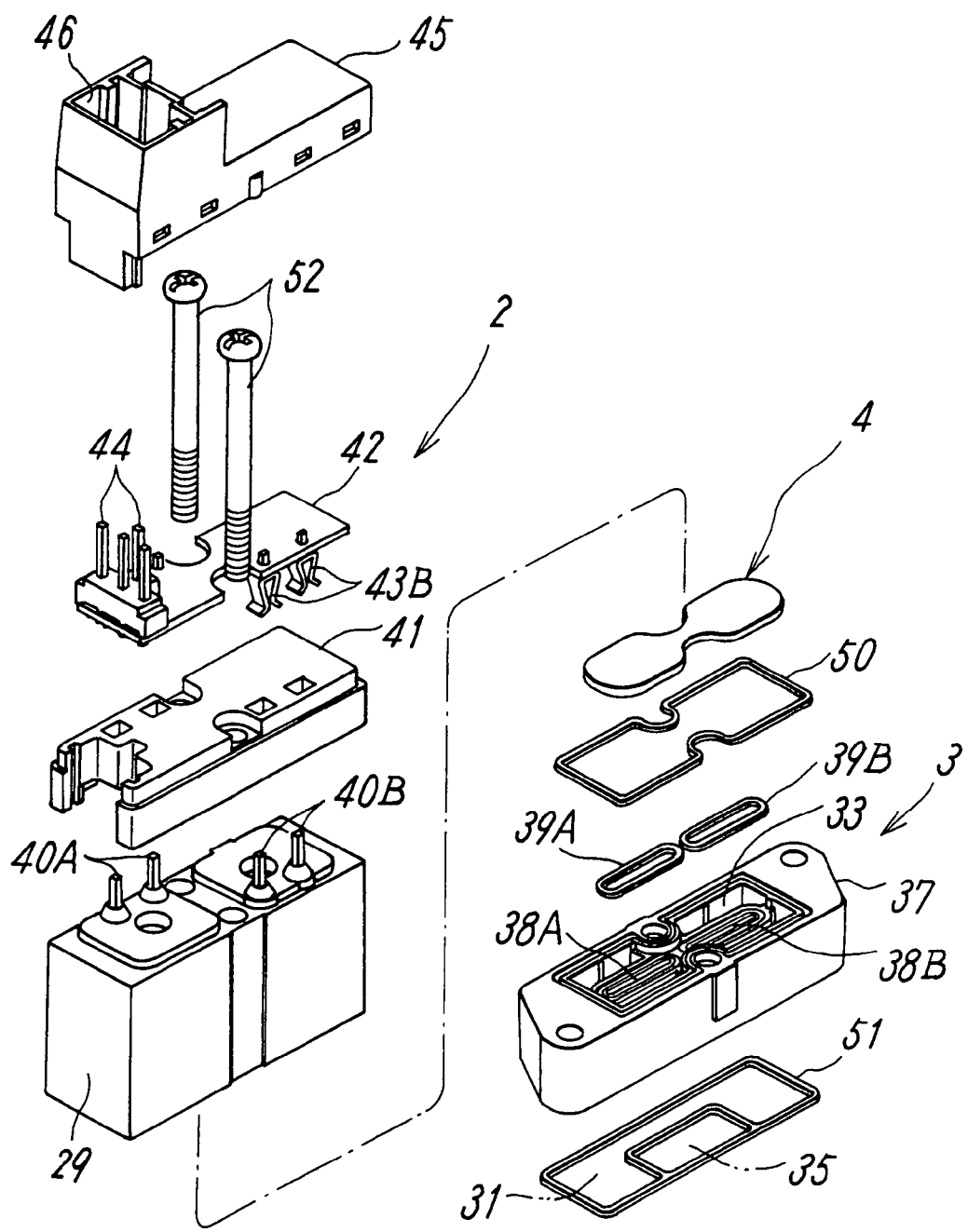
FIG. 2 is an exploded perspective view of the embodiment of the invention.
Figure 3:
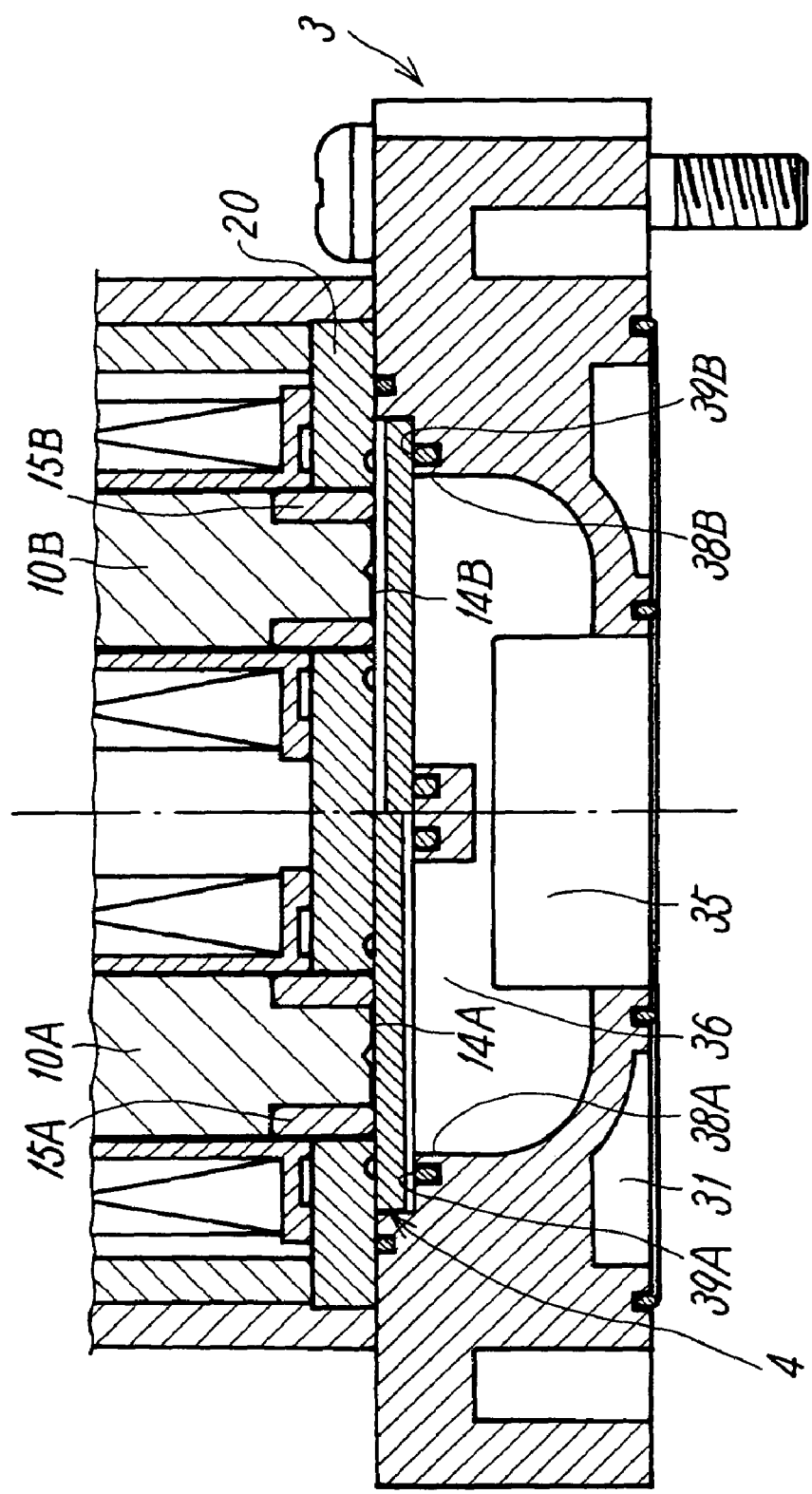
FIG. 3 shows an enlarged sectional view of an essential portion of the embodiment of the invention with a right half part showing a closed state of a movable valve and a left half part showing an open state.

FIGS. 1 to 3 show the embodiment of a valve device according to the invention. This valve device 1 generally includes a solenoid portion 2, a valve body portion 3 connected to the solenoid portion 2 and having an input flow path and an output flow path for pressurized fluid, and a movable valve 4 made of a paramagnetic material and for opening and closing according to actuation of the solenoid portion 2.

The solenoid portion 2 includes first and second solenoids 21A and 21B respectively formed by winding coils 22A and 22B around a plurality of bobbins 23A and 23B. These first and second solenoids 21A and 21B include first and second fixed cores 10A and 10B disposed in the bobbins 23A and 23B wherein one end of the fixed cores 10A and 10B are formed as magnetic attracting faces 14A and 14B for attracting the movable valve 4, and the first and second solenoids 21A and 21B are disposed so that the magnetic attracting faces 14A and 14B are adjacent to each other on the same plane. The solenoids 21A and 21B include a common magnetic frame 24 covering the solenoids 21A and 21B and having a top panel portion 24a in contact with end faces 11A and 11B of the respective fixed cores 10A and 10B on an opposite side to the attracting faces 14A and 14B and a common magnetic plate 20 disposed substantially on the same plane as the magnetic attracting faces 14A and 14B of the fixed cores 10A and 10B.

As shown in FIG. 1, the magnetic frame 24 is made of a paramagnetic material having an angular-U sectional shape, having the top panel portion 24a and side panel portions 24b on opposite end sides of the top panel portion 24a, and disposed so as to cover the first and second solenoids 21A and 21B. When it is necessary to upsize a magnetic path section, side panel portions for covering front and back faces of the first and second solenoids 21A and 21B in FIG. 1 may be provided. Lower end faces 24c of the side panel portions 24b of the magnetic frame 24 are magnetically joined to the magnetic plate 20 made of a paramagnetic material.

In the magnetic plate 20, through holes 28A and 29B into which end portions of the first and second fixed cores 10A and 10B on a side of the magnetic attracting faces 14A and 14B are inserted are formed.

On the other hand, the first and second fixed cores 10A and 10B air-tightly fitted in central portions of the bobbins 23A and 23B of the first and second solenoids 21A and 21B through O-rings are formed with small-diameter portions 12A and 12B on the side of the magnetic attracting faces 14A and 14B. Through cushions 15A and 15B fitted over the small-diameter portions 12A and 12B from outside, the fixed cores 10A and 10B are fixed to the through holes 28A and 28B. The attracting faces 14A and 14B of the fixed cores 10A and 10B and a lower face of the magnetic plate 20 are positioned substantially on the same plane. Therefore, the magnetic plate 20 and each of the first and second fixed cores 10A and 10B are close to each other through the cushion 15A or 15B and are not directly and magnetically joined to each other and resistance is applied to a magnetic flux between them.

A whole outer periphery of the magnetic frame 24 from a periphery of the magnetic plate 20 to the top panel portion 24a is covered with a sealing member 29 made of a synthetic resin material and two pairs of coil terminals 40A, 40A and 40B, 40B electrically connected to the coils of the first and second solenoids 21A and 21B rise from an upper face of the sealing member 29 as shown in FIGS. 1 and 2.

On the upper face of the sealing member 29, a spacer 41 having through holes for the coil terminals 40A, 40A, 40B, and 40B is fitted and a printed board 42 is placed on an upper face of the spacer 41. Sockets 43A, 43A, 43B, and 43B connected to a current-carrying circuit (not shown) in an electrically conductive manner project from a lower face of the printed board 42 to be electrically coupled to the coil terminals 40A, 40A, 40B, and 40B respectively in the through holes in the spacer 41. Moreover, from one end of an upper face of the printed board 42, a plurality of receiving terminals 44 connected to the current-carrying circuit in an electrically conductive manner rise. The printed board 42 is covered with a cover 45 and the receiving terminals 44 are housed in a terminal pipe 46 formed in the cover 45.

Wiring is installed for the first and second solenoids 21A and 21B in such a manner that polarities of magnetic poles generated in the first and second fixed cores 10A and 10B are opposite to each other.

Energization of the solenoids 21A and 21B can also be carried out by directly joining the coil terminals to the printed board 42 without using the sockets 43A and 43B.

In the solenoid portion 2 formed in the above manner, magnetic fluxes are generated in the fixed cores 10A and 10B respectively in the first solenoid 21A and second solenoid 21B as a result of energization and a magnetic path is formed through the respective fixed cores 10A and 10B, the top panel portion 24a and the side panel portions 24b of the magnetic frame 24, the magnetic plate 20, and the movable valve 4 as shown by hollow arrows A and solid-line arrows a in FIG. 1. Because the polarities of the magnetic fields in the first fixed core 10A and the second fixed core 10B are opposite to each other, the magnetic path effectively utilizing a central portion of the top panel portion 24a through the first fixed core 10A and the second fixed core 10B is formed through the first fixed core 10A, the top panel portion 24a of the magnetic frame 24, the second fixed core 10B, and the movable valve 4 as shown by the hollow arrows A and the solid-line arrows b in FIG. 1. If the polarity of energization is reversed, the reverse magnetic path is formed as shown by broken-line hollow arrows B.

It has been explained that the wiring is installed for the first and second solenoids 21A and 21B in such a manner that polarities of magnetic poles generated in the first and second fixed cores 10A and 10B are opposite to each other. However, it is also possible to install wiring so that the polarities of the magnetic poles generated in both the fixed cores 10A and 10B are in the same direction in a case of this embodiment.

With both types of wiring, because the two fixed cores 10A and 10B are used and the above-described magnetic path is formed, an extremely large magnetic attracting force, i.e., at least twice that generated in a case of using a single solenoid is generated between the magnetic plate 20, the attracting faces 14A and 14B of the first and second fixed cores 10A and 10B, and the movable valve 4 and responsiveness is improved.

On the other hand, the valve body portion 3 connected to the solenoid portion 2 includes a body 37 having the input flow path 33 (FIG. 2) and the output flow path 36 for compressed air and valve seats 39A and 39B positioned between these flow paths and the movable valve 4 made of the paramagnetic material and attracted by the magnetic plate 20 and the first and second fixed cores 10A and 10B when the solenoid portion 2 is energized is housed between the valve body portion 3 and the solenoid portion 2 as shown in FIGS. 1 and 2. This valve body portion 3 carries out opening and closing of the valve seats 39A and 39B with the movable valve 4 according to actuation of the solenoid portion 2.

The body 37 has an input port 31 which communicates with the input flow path 33 and through which compressed air is supplied and an output port 35 which communicates with the output flow path 36 and through which compressed air is output. The output flow path 36 passes through a central portion of the input flow path 33 so as to be surrounded by the input flow path 33 and is divided into and opens at two output openings 38A and 38B which are long in an arranged direction of the first and second solenoids 21A and 21B. At peripheral edges of the output openings 38A and 38B, sealing members forming the valve seats 39A and 39B are provided. The valve seats 39A and 39B may be formed by caulking the members forming them to the body 37 or by fixing the members to the body 37 by molding or may be molded integrally with the body 37.

The output openings 38A and 38B and the valve seats 39A and 39B are substantially opposed to the attracting faces 14A and 14B of the fixed cores 10A and 10B in the first and second solenoids 21A and 21B and the output openings 38A and 38B (and the valve seats 39A and 39B) are in oval shapes each having semicircular opposite ends and parallel sides at the center as shown in FIG. 4(A) and are arranged in a row long in a direction in which the solenoids 21A and 21B are adjacent to each other.

It is preferable that a diameter x of the semicircular portions and a length y of the parallel portion of each of the output openings 38A and 38B in FIG. 4(A) are in such ranges as to have a relationship of $y/x \geq 2$.

The shapes of the output openings 38A and 38B are not limited to the oval shapes shown in FIG. 4(A) but may be substantially rectangular shapes each having four rounded corners as shown in FIG. 4(B). Moreover, the output openings 38A and 38B need be long in the direction in which the solenoids 21A and 21B are adjacent to each other. However, various long shapes may be used according to objects, design constraints, and the like.

The movable valve 4 is formed of a paramagnetic iron piece having figure 8-shaped outside shape which can cover the two valve seats 39A and 39B and includes in its form portions to be attracted by the respective fixed cores 10A and 10B and the magnetic plate 20 on opposite sides of the fixed cores 10A and 10B. The movable valve 4 is disposed to be able to move freely in an opening/closing direction of the valve seats 39A and 39B while a portion of a peripheral edge of the valve 4 is guided by the body 37. Therefore, at a periphery of the movable valve 4, a flow path is formed to allow the compressed air to flow from the input flow path 33 into between the movable valve 4 and the solenoid portion 2.

When the first and second solenoids 21A and 21B are energized, the movable valve 4 is separated from the valve seats 39A and 39B and opened as shown in a left half of FIG. 3 by magnetic attracting force generated between the magnetic plate 20 and the attracting faces 14A and 14B of the first and second fixed cores 10A and 10B. When energization is cancelled, the movable valve 4 is pressed by the compressed air that flows into an upper face of the movable valve 4 through the input flow path 33 and is pressed against the first and second valve seats 39A and 39B as shown in a right half of FIG. 3, the output openings 38A and 38B are closed, and the compressed air is not output from the output port 35. In this case, because the pressing force of the compressed air for pressing the movable valve 4 in the valve-closing direction acts on a portion of the movable valve 4 facing the output flow path 36, the movable valve operates stably and with excellent responsiveness.

Although a stroke of the movable valve 4 is very short, the valve seats 39A and 39B are in oval plane shapes having long opening circumferences with respect to opening areas and therefore the responsiveness is excellent and a large flow rate of compressed air can be secured.

Although the fluid pressure which has reached the upper face of the movable valve 4 from the input flow path 33 is used as means for seating the movable valve 4 on the valve seats 39A and 39B, it is also possible to use another means such as a spring or to use both of the pressure of fluid and the spring.

The cushions 15A and 15B fitted over the small-diameter portions 12A and 12B of the first and second fixed cores 10A and 10B on the side of the magnetic attracting faces 14A and 14B from outside are disposed so as to project slightly from the magnetic attracting faces 14A and 14B and the lower face of the magnetic plate 20. As a result, the responsiveness in closing the valve seats 39A and 39B when energization is cancelled is enhanced or it is possible to prevent generation of a collision sound when the movable valve 4 collides with the magnetic plate 20 and the like or to prevent the movable valve 4 from coming in close contact with the magnetic plate 20 and the like to reduce responsiveness in valve closing when the movable valve 4 is opened.

In the body 37 formed in the above-noted manner, as shown in FIG. 2, a first sealing member 50 is provided in a groove formed in a face connected to the solenoid portion 2 and a second sealing member 51 is provided in a groove in a lower face of the body 37. The solenoid portion 2 and the valve body portion 3 are air-tightly coupled and integrated with each other by inserting fastening bolts 52, 52 into bolt holes formed in the spacer 41, the sealing member 29, and the body 37. This integrated valve device 1 is air-tightly mounted to a mounting face of a desired apparatus having fluid paths communicating with the input port 31 and the output port 35 by mounting bolts 53, 53 (see FIG. 1) inserted through bolt holes formed in the body 37.

FIGS. 5 and 6 show another embodiment of the invention. While a recessed portion for housing the movable valve 4 is formed in a face of the body 37 in the valve body portion 3 to be joined to the solenoid portion 2 in the embodiment shown in FIGS. 1 to 3, the recessed portion for housing the movable valve 4 is formed along the magnetic plate 20 in the solenoid portion 2 in the embodiment shown in FIGS. 5 and 6. While the two output openings 38A and 38B and the two valve seats 39A and 39B are provided to face the attracting faces 14A and 14B of the fixed cores 10A and 10B in the first and second solenoids 21A and 21B in the embodiment described by using FIGS. 1 to 4, the output flow path 36 is not divided and opens at a single oval output opening 38 which is long in the arranged direction of the first and second solenoids 21A and 21B and a seal forming a valve seat 39 is provided on a periphery of the output opening 38 in the embodiment shown in FIGS. 5 and 6.

In FIG. 6, a reference numeral 54 designates bolts for fixing the spacer 41 to the sealing member 29 of the solenoid portion 2 and reference numerals 55 designate bolts for fixing the solenoid portion 2 to the valve body portion 3.

Since other structures and operations in the embodiment in FIGS. 5 and 6 are substantially the same as the embodiment described by using FIGS. 1 to 4, similar or corresponding portions are provided with similar reference numerals to omit descriptions of these portions.

FIGS. 7(A) and 7(B) respectively and schematically show different examples of structures of the solenoid portion 2 and the movable valve 4. In both cases, plates 20A, 20B corresponding to the magnetic plate 20 in the embodiment shown in FIGS. 1 to 3 are made of non-magnetic material. Because these plates 20A and 20B are not involved in operation of the solenoid portion 2, they can be omitted under certain circumstances.

In the solenoid portion 2 in FIG. 7(A), because the plate 20A is made of the non-magnetic material, a magnetic path is formed to extend from the fixed cores 10A and 10B through the top panel portion 24a and the opposite side panel portions 24b of the magnetic frame 24 to directly reach the movable valve 4. Therefore, opposite end portions of the movable valve 4 extend to such positions so as to come in close contact with the lower end faces 24c of the opposite side panel portions 24b of the magnetic frame 24. In this case, the polarities of the magnetic fields in the first fixed core 10A and the second fixed core 10B may be opposite to each other or in the same direction.

On the other hand, in the solenoid portion 2 shown in FIG. 7(B), the movable valve 4 only extends to such positions as to face the magnetic attracting faces 14A and 14B of the fixed cores 10A and 10B. Therefore, it is necessary to install wiring so that the polarities of the magnetic fields in the first fixed core 10A and the second fixed core 10B are opposite each other and to form a magnetic path extending from one of the fixed cores through the top panel portion 24a of the magnetic frame 24 to reach the other fixed core and directly reaching the movable valve 4 from the magnetic attracting faces 14A and 14B of both the fixed cores in the solenoid portion 2. Here, if the side panel portions covering the front and back faces of the first and second solenoids 21A and 21B are provided to the magnetic frame 24 and a portion of the movable valve is in close contact with lower ends of the side panel portions, the polarities of the magnetic fields in the first fixed core 10A and the second fixed core 10B may be opposite to each other or in the same direction similarly to the case in Fig. 7(A).

Since other structures and operations of the valve device having the solenoid portion and the movable valve shown in FIGS. 7(A) and 7(B) are substantially the same as the embodiment described by using FIGS. 1 to 4, main similar or corresponding portions are provided with similar reference numerals to omit descriptions of the portions.

The above-described respective valve devices are suitable for use for a selector for removing impurities and the like included in particulate matter such as grains and semiconductor chips. In this case, in order to arrange the large number of valve devices 1 in a row to thereby treat a large amount of particulate matter at a time, it is extremely advantageous to be able to reduce widths of the solenoid portion 2 and the valve body portion 3.

The invention is not limited to the above-described embodiments but may be in various forms without departing from scope of the claims.

For example, the first and second solenoids 21A and 21B may be electrically connected in parallel or in series. The number of the solenoids is not limited to two but a desired number of solenoids may be arranged. The number of the valve seats 39A and 39B is not limited to two but a single valve seat which is long in the arranged direction of the solenoids 21A and 21B or three or more valve seats may be provided.

According to the above-describe valve device of the invention, it is possible to obtain the valve device the large number of which densely arranged in the row can be made compact as a whole while suppressing reductions in responsiveness and the flow rate by using the open/close valve with the short stroke. More concretely, it is possible to obtain the valve device in which the width of the valve body portion is minimized and the solenoid portion can produce the necessary output with the small width corresponding to the width of the valve body portion while suppressing reductions in responsiveness and the flow rate by using the open/close valve with the short stroke. The output flow path is formed to be long in the arranged direction of the plurality of solenoids and, as a result, the movable valve is in the long shape. However, because the plurality of solenoids are arranged in the row in the longitudinal direction of the movable valve, it is possible to cause the whole movable valve to operate stably by the large magnetic attracting force and to enhance responsiveness.

The invention claimed is:

1. A valve device having a plurality of solenoids and comprising:

a solenoid portion having magnetic attracting faces for attracting a movable valve at one ends of fixed cores disposed in coils;

a valve body portion connected to the solenoid portion and having an input flow path and an output flow path for pressurized fluid;

the movable valve being made of paramagnetic material to open and close a valve seat between both the flow paths, the valve device carrying out opening and closing of the valve seat by the movable valve according to actuation of the solenoid portion, wherein the solenoid portion has the plurality of solenoids having the attracting faces of the fixed cores arranged to be adjacent to each other on the same plane and a common magnetic frame covering the solenoids and having a top panel portion in contact with end faces of the respective fixed cores on opposite sides to the attracting faces, wherein an opening portion surrounded by the valve seat of the output flow path for the pressurized fluid in the valve body portion slenderly extends in an arranged direction of the plurality of solenoids, and wherein the movable valve has a portion facing at least the respective fixed cores and attracted by the fixed cores when the plurality of solenoids are energized, and a device for seating the movable valve on the valve seat when the energization is cancelled.

2. A valve device having a plurality of solenoids and according to claim 1, wherein cushions projecting to such an extent as to prevent the movable valve from coming in close contact with the attracting faces of the fixed cores when the solenoids are energized are disposed at peripheries of the fixed core.

3. A valve device having a plurality of solenoids and according to claim 2, wherein wiring is installed for the plurality of solenoids so that polarities of magnetic fluxes generated in the fixed cores of the adjacent solenoids when the solenoids are energized are opposite to each other.

4. A valve device having a plurality of solenoids and according to claim 3, wherein, as said device for seating the movable valve on the valve seat when the energization is cancelled, the movable valve is arranged so that the pressurized fluid from the input flow path presses the movable valve against the valve seat in which the output flow path is open.

5. A valve device having a plurality of solenoids and according to claim 3, wherein a plurality of valve seats are provided to face the attracting faces of the fixed cores of the plurality of solenoids and are arranged in a row so as to be elongated in a direction in which the solenoids are adjacent to each other.

6. A valve device having a plurality of solenoids and according to claim 2, wherein, as said device for seating the movable valve on the valve seat when the energization is cancelled, the movable valve is arranged so that the pressurized fluid from the input flow path presses the movable valve against the valve seat in which the output flow path is open.

7. A valve device having a plurality of solenoids and according to claim 6, wherein a plurality of valve seats are provided to face the attracting faces of the fixed cores of the plurality of solenoids and are arranged in a row so as to be elongated in a direction in which the solenoids are adjacent to each other.

8. A valve device having a plurality of solenoids and according to claim 2, wherein a plurality of valve seats are provided to face the attracting faces of the fixed cores of the plurality of solenoids and are arranged in a row so as to be elongated in a direction in which the solenoids are adjacent to each other.

9. A valve device having a plurality of solenoids, according to claim 1, further comprising a magnetic plate disposed substantially on the same plane as the magnetic attracting faces of the fixed cores, magnetically joined to the magnetic frame, and not joined to the fixed cores, wherein the movable valve has portions respectively facing the respective fixed cores and the magnetic plate on opposite sides of the fixed cores and attracted by the fixed cores and the magnetic plate when the plurality of solenoids are energized.

10. A valve device having a plurality of solenoids and according to claim 9, wherein wiring is installed for the plurality of solenoids so that polarities of magnetic fluxes generated in the fixed cores of the adjacent solenoids when the solenoids are energized are opposite to each other.

11. A valve device having a plurality of solenoids and according to claim 10, which comprises cushions for applying resistance to magnetic fluxes between the fixed cores and the magnetic plate and projecting to such an extent as to prevent the movable valve from coming in close contact with the attracting faces of the fixed cores and the magnetic plate when the solenoids are energized are disposed between the fixed cores and the magnetic plate.

12. A valve device having a plurality of solenoids and according to claim 10, wherein a plurality of valve seats are provided to face the attracting faces of the fixed cores of the plurality of solenoids and are arranged in a row so as to be elongated in a direction in which the solenoids are adjacent to each other.

13. A valve device having a plurality of solenoids and according to claim 9, which comprises cushions for applying resistance to magnetic fluxes between the fixed cores and the magnetic plate and projecting to such an extent as to prevent the movable valve from coming in close contact with the attracting faces of the fixed cores and the magnetic plate when the solenoids are energized are disposed between the fixed cores and the magnetic plate.

14. A valve device having a plurality of solenoids and according to claim 9, wherein a plurality of valve seats are provided to face the attracting faces of the fixed cores of the plurality of solenoids and are arranged in a row so as to be elongated in a direction in which the solenoids are adjacent to each other.

15. A valve device having a plurality of solenoids and according to claim 1, wherein wiring is installed for the plurality of solenoids so that polarities of magnetic fluxes generated in the fixed cores of the adjacent solenoids when the solenoids are energized are opposite to each other.

16. A valve device having a plurality of solenoids and according to claim 15, wherein, as said device for seating the movable valve on the valve seat when the energization is cancelled, the movable valve is arranged so that the pressurized fluid from the input flow path presses the movable valve against the valve seat in which the output flow path is open.

17. A valve device having a plurality of solenoids and according to claim 15, wherein a plurality of valve seats are provided to face the attracting faces of the fixed cores of the plurality of solenoids and are arranged in a row so as to be elongated in a direction in which the solenoids are adjacent to each other.

18. A valve device having a plurality of solenoids and according to claim 1, wherein, as said device for seating the movable valve on the valve seat when the energization is cancelled, the movable valve is arranged so that the pressurized fluid from the input flow path presses the movable valve against the valve seat in which the output flow path is open.

19. A valve device having a plurality of solenoids and according to claim 18, wherein a plurality of valve seats are provided to face the attracting faces of the fixed cores of the plurality of solenoids and are arranged in a row so as to be elongated in a direction in which the solenoids are adjacent to each other.

20. A valve device having a plurality of solenoids and according to claim 1, wherein a plurality of valve seats are provided to face the attracting faces of the fixed cores of the plurality of solenoids and are arranged in a row so as to be elongated in a direction in which the solenoids are adjacent to each other.

* * * * *